United States Patent
Walz

(10) Patent No.: US 6,908,265 B2
(45) Date of Patent: Jun. 21, 2005

(54) METHOD OF MACHINING WORKPIECES HAVING STRAIGHT SURFACE RECESSES

(75) Inventor: Jürgen Walz, Frickenhausen (DE)

(73) Assignee: Werkxeugmaschinenfabrik Zerbst GmbH, Zerbst (DE)

(*) Notice: Subject to any disclaimer, the term of this patent is extended or adjusted under 35 U.S.C. 154(b) by 46 days.

(21) Appl. No.: 10/376,050

(22) Filed: Feb. 27, 2003

(65) Prior Publication Data
US 2003/0161698 A1 Aug. 28, 2003

(30) Foreign Application Priority Data
Feb. 27, 2002 (DE) .......................... 102 08 411

(51) Int. Cl.⁷ .................. B23C 1/12; B23B 39/08; B23B 41/04
(52) U.S. Cl. .................. 409/132; 409/84; 409/137; 408/1 R; 408/3; 408/236; 700/194; 700/189
(58) Field of Search .................. 409/132, 131, 409/79–80, 84, 137, 143, 191; 408/1 R, 3, 187–188, 236; 700/189, 193, 194

(56) References Cited

U.S. PATENT DOCUMENTS

| | | | | |
|---|---|---|---|---|
| 1,671,354 A | * | 5/1928 | De Leeuw | 29/38 A |
| 3,782,847 A | * | 1/1974 | Kulzer | 408/1 R |
| 4,981,402 A | * | 1/1991 | Krenzer et al. | 409/26 |
| 5,023,983 A | * | 6/1991 | Winkler et al. | 29/27 R |
| 5,282,144 A | * | 1/1994 | Kawamura et al. | 700/189 |
| 5,699,598 A | * | 12/1997 | Hessbruggen et al. | 29/27 C |
| 5,759,140 A | * | 6/1998 | Egbert | 408/1 R |
| 5,773,950 A | * | 6/1998 | Yamamoto | 700/194 |
| 5,781,983 A | * | 7/1998 | Gruner | 409/137 |

FOREIGN PATENT DOCUMENTS

| | | |
|---|---|---|
| AU | 737156 | 6/1999 |
| WO | WO99/30054 | 6/1999 |

\* cited by examiner

Primary Examiner—Erica Cadugan
(74) Attorney, Agent, or Firm—Cohen, Pontani, Lieberman & Pavane

(57) ABSTRACT

In a method of machining a first and a second surface recess in a workpiece, the workpiece has a longitudinal axis and a first local Cartesian coordinate system. The machine tool has a longitudinal axis and a second local Cartesian coordinate system, the first and second surface recess are associated with a first and second recess longitudinal axis and a non-circular cross-section. The recesses are separated on the surface of the workpiece such that they are mirror images of each other about a plane along the longitudinal workpiece axis. A skew angle is defined between the first recess longitudinal axis and the workpiece axis in the first plane. The method includes setting the tool axis at a start or setting angle relative to a first major axis (Z-axis) in a first plane in the second local Cartesian coordinate system; rotating the first and second local Cartesian coordinate system relative to one another until a projection of the tool axis onto a second plane (X-Y plane) of the first local Cartesian coordinate system is parallel to a second major axis of the second local Cartesian coordinate system such that when the skew angle is 0.deg, the first surface recess is machined solely by displacement of the machine tool relative to the workpiece in the direction of the longitudinal tool axis (Z-axis), or when the skew angle of other than 0.deg, the first surface recess is machined solely by displacement of the machine tool relative to the workpiece in all three axes of the second local Cartesian coordinate system.

6 Claims, 4 Drawing Sheets

Fig. 3

METHOD OF MACHINING WORKPIECES HAVING STRAIGHT SURFACE RECESSES

PRIORITY CLAIM

This application claims priority to application DE 102 08 411.4 filed on Feb. 27, 2002 in Germany.

FIELD OF THE INVENTION

The invention relates to a method of machining workpieces having straight surface recesses, for example grooves, wherein the cross-sections are non-circular.

BACKGROUND OF THE INVENTION

In this method, it is disadvantageous that, during the machining of surface recesses with different skew angles with respect to the tool axis, the tool had to be pivoted, which required a corresponding design input in the form of an additional pivot axis for the tool.

SUMMARY OF THE INVENTION

The object of the invention is to reduce the design input and nonetheless at the same time permit a simple control of the machining operation. Preferably this is solely achieved by a rectilinear relative movement between tool and workpiece within the Cartesian coordinate system of the machine tool.

This and other objects are achieved by a method of machining a first and a second surface recess in a workpiece with a machine tool. The workpiece has a longitudinal workpiece axis and a first local Cartesian coordinate system. The machine tool has a longitudinal tool axis and a second local Cartesian coordinate system. The first and second surface recesses are associated with a first and second recess longitudinal axis. Each recess has a non-circular cross-section. The first and the second surface recesses are separated on the surface of the workpiece such that they are mirror images of each other about a plane along the longitudinal workpiece axis. A skew angle is defined between the first recess longitudinal axis and the workpiece axis in the first plane. The method includes setting the tool axis at a start or setting angle relative to a first major axis (Z-axis) in a first plane in the second local Cartesian coordinate system; rotating the first and second local Cartesian coordinate system relative to one another until a projection of the tool axis onto a second plane (X-Y plane) of the first local Cartesian coordinate system is parallel to a second major axis of the second local Cartesian coordinate system such that when the skew angle is zero degrees, the first surface recess is machined solely by displacement of the machine tool relative to the workpiece in the direction of the longitudinal tool axis (Z-axis), or when the skew angle of other than zero degrees, the first surface recess is machined solely by displacement of the machine tool relative to the workpiece in all three axes of the second local Cartesian coordinate system. The method further includes machining the first surface recess; then rotating the machine tool about the longitudinal workpiece axis (C-axis) to form a mirror image of the first surface with the second surface recess; and then machining the second surface recess.

Thus, it is possible to produce rectilinear surface recesses having any desired skew angle, i.e. having a skew angle zero degrees, at which the longitudinal direction of the surface recess and the axial direction of the workpiece run in parallel, and having skew angles of ±>zero degrees, i.e. surface recesses running alternately in opposite directions, without having to provide an additional pivot axis for the tool in the case of surface recesses having a skew angle of ±>zero degrees, and to carry out the machining solely by interpolation between the axes X, Y and Z the control during the machining of the surface recesses. In the special case in which the longitudinal axis of the surface recess runs parallel to the workpiece axis, only a relative movement between workpiece and tool in the Z-direction of the machine coordinate system is needed. This results in simple machining with a machine tool of simple design, as is also case by means of the turning operation in accordance with EP 0 926 373 (Australian equivalent AU 737156), in which workpieces, which also have surface recesses, in particular workpieces for constant velocity joints, are machined.

An especially advantageous embodiment of the invention can be seen in the fact that the workpiece is machined in a suspended manner so that the machining chips fall away. A special case of the suspended machining is the mounting of the workpiece in a vertically arranged work spindle. The falling away of the machining chips has the advantage that guideways and other devices of the machine tool are not impaired and that no thermal problems occur at the workpiece due to red hot chips remaining in the workpiece. The vertical work spindle brings about the advantages which are normal in this type of machine and which, for example, lie in the fact that simple handling of the workpieces is possible by the pickup method.

On account of the embodiment according to the invention, it is possible to produce surface recesses sloping both to the left and the right, without pivoting either the workpiece or the tool about a pivot axis of the Cartesian coordinate system of the machine tool. The displacement between workpiece and tool is therefore effected only in a linear direction in accordance with the three axes of the coordinate system. The rotation axis C is only necessary in order to cyclically advance the workpiece for machining the successive parallel paths.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DESCRIPTION OF THE PRESENTLY PREFERRED EMBODIMENT

Figure 1:
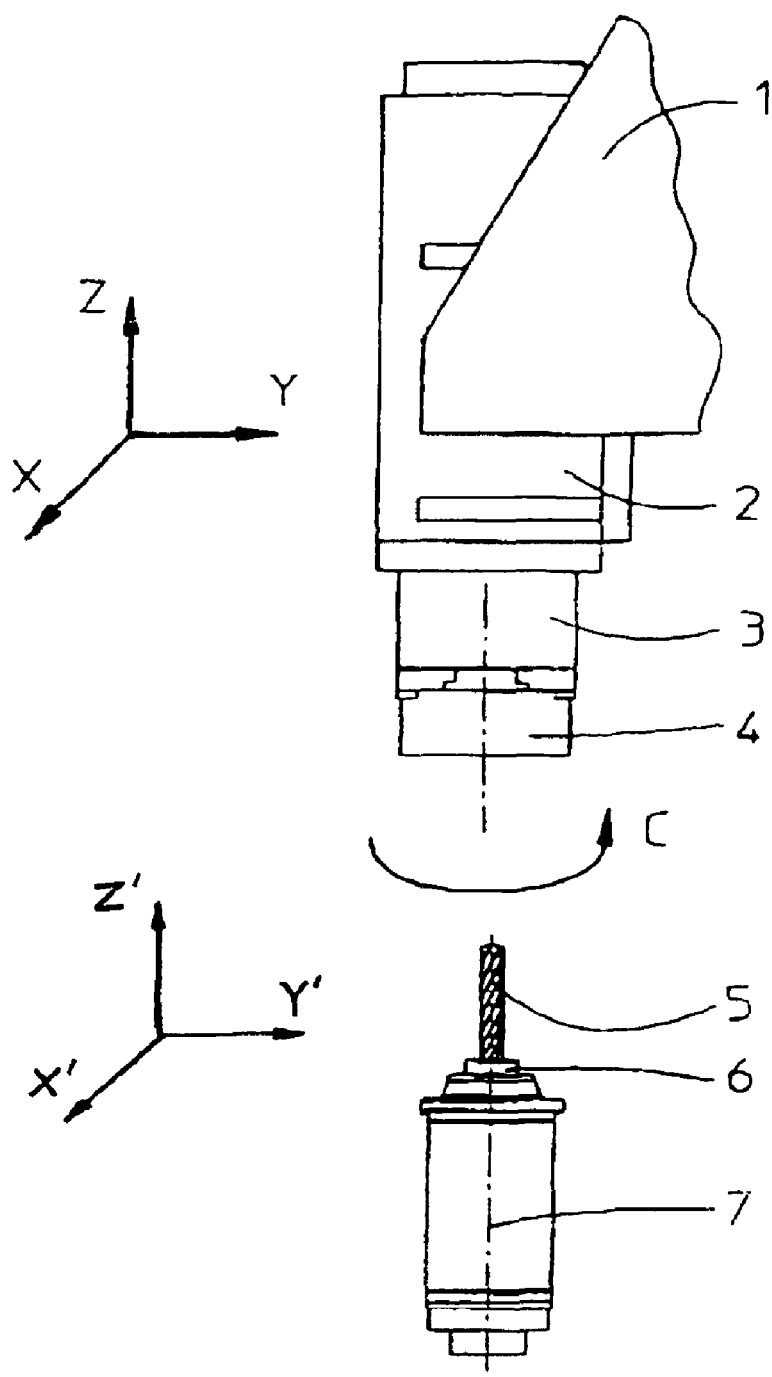
FIG. 1 is a plan view of a headstock with work spindle and tool in the X-direction.

With reference to FIG. 1, a work spindle 2 is arranged on a vertically arranged headstock 1 in such a way as to be displaceable in the Z-direction of the Cartesian coordinate system of the workpiece. The headstock 1 can be displaced in the X- and Y-directions by means of slides (not shown). Held in a chuck 3 of the work spindle 2 is a workpiece 4, in which surface recesses 8 (not shown in FIG. 1) which are rectilinear but are crossed over the workpiece axis in opposite directions are to be produced. Serving to produce these surface recesses 8 is a milling tool 5 which is held in a milling spindle 6. The milling spindle 6 is held in a tool turret of a machine tool (neither shown) that can be driven. The milling tool has its own machine tool coordinate system X', Y', Z' in which the Z' axis is parallel to the Z axis.

Figure 2:
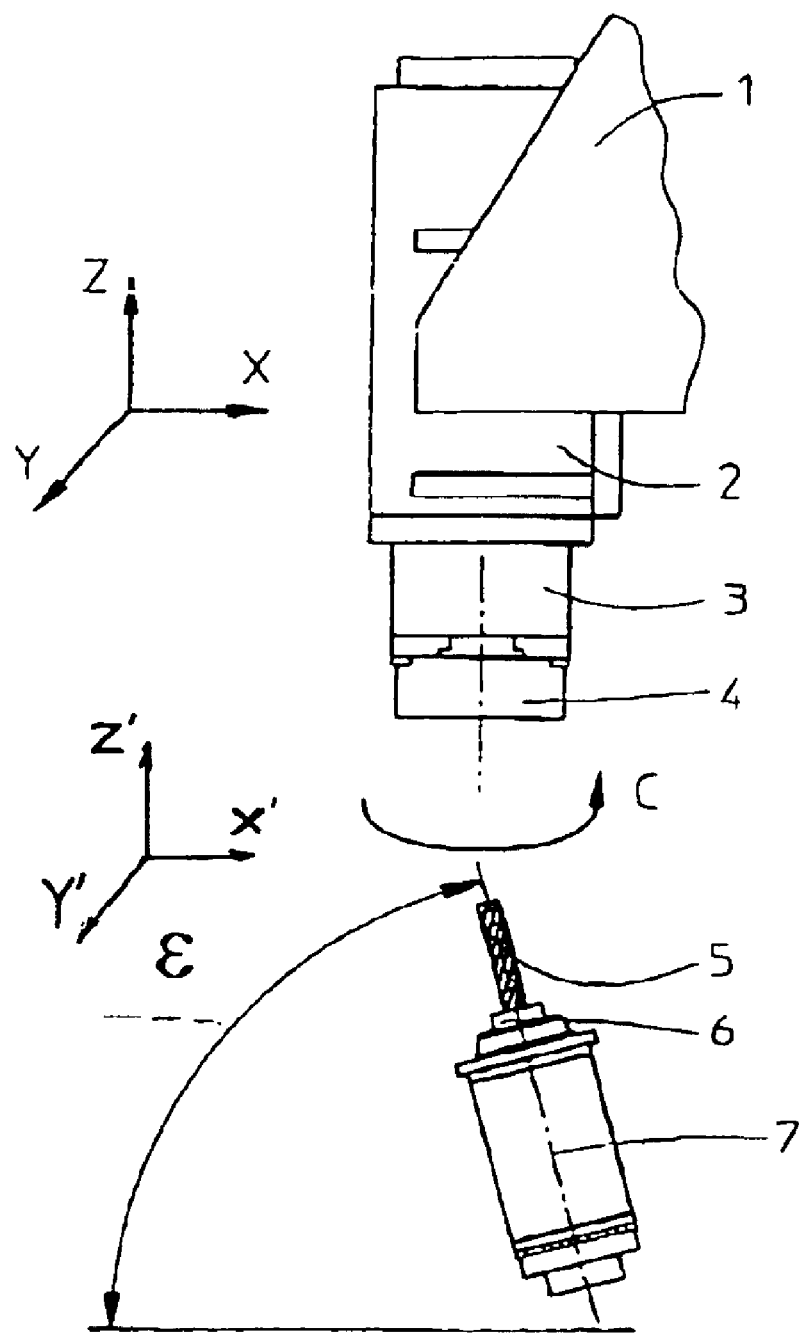
FIG. 2 is an elevational view of the headstock with work spindle and tool shown in FIG. 1.

As can be seen from FIG. 2, an axis 7 of the milling spindle 6 is at an angle to the plane defined by the axes X' and Y'. This angle is designated by $\epsilon$ and constitutes a solid angle. Angle $\epsilon$ is obtained by virtue of the fact that the milling spindle, relative to the workpiece 4, assumes a start angle $\alpha$ for achieving a profile cross-section differing from the circular form and a further angle $\beta$ which is necessary in order to achieve a certain skew angle or helical.

Figure 3:
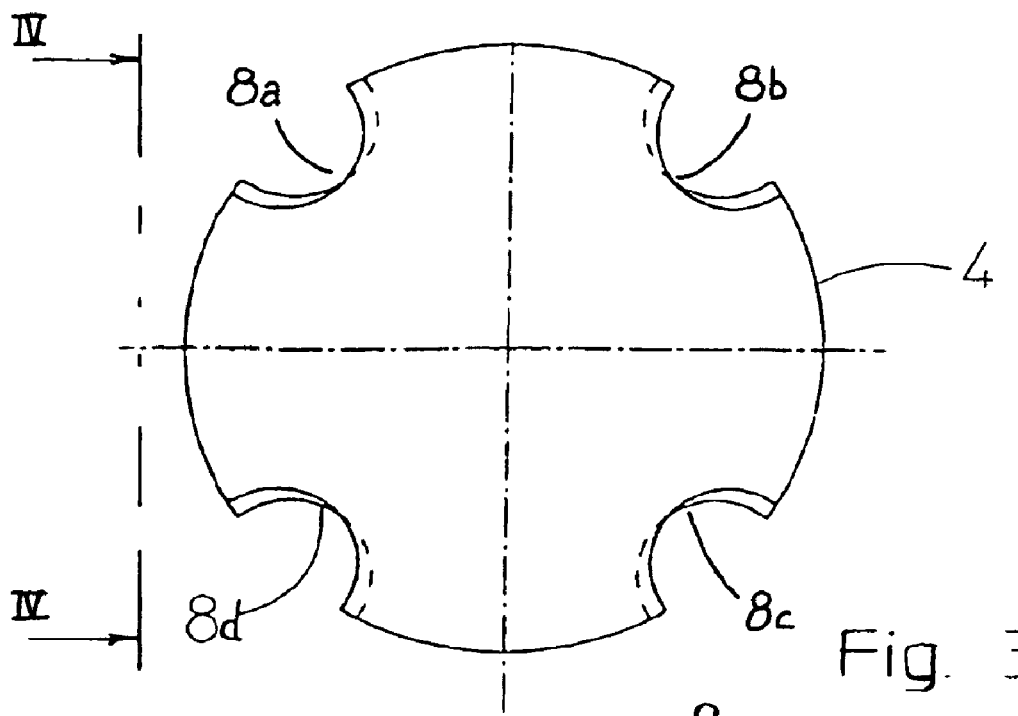
FIG. 3 is a plan view of a cam plate.
Figure 4:
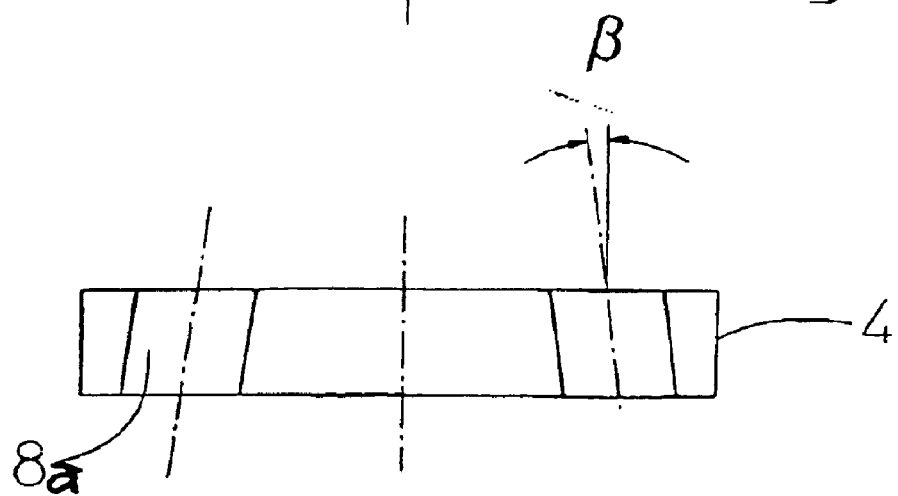
FIG. 4 is a side view of the cam plate along line IV—IV of FIG. 3.

For example, workpiece 4 is a cam plate and is shown in FIGS. 3 and 4. Formed on the outer circumference of the cam plate are surface recesses 8a–8d, which were machined in accordance with the present invention.

As can be seen from FIG. 4 the surface recesses 8b and 8d have a left-hand orientation, i.e., a negative skew angle, and surface recesses 8a and 8c have a right-hand orientation. i,e., a positive skew angle. Adjacent surface of recesses 8a–d are inclined differently by an angle $\beta$. The angle $\epsilon$ is obtained by setting the milling tool relative to the workpiece 4 in accordance with the start angle $\alpha$ and in accordance with the angle $\beta$ and is measured in the plane of projection onto the XY plane as shown in FIG. 2. This angle is obtained by virtue of the fact that the Cartesian coordinate system XYZ of the workpiece and the coordinate system X'Y'Z' of the machine tool are rotated relative to one another until the projection of the tool axis on the X-Y plane lies parallel to an assumed main axis of the coordinate system. In the process, the relative rotation of the workpiece and machine tool is effected about the C-axis which may, for example, be parallel to the Z axis or the Z' axis.

For good accessibility when operating the machine, it is expedient to arrange the milling spindle 6 in such a way that it is directed away from the operator, as can be seen from FIG. 1. Because of this, the X'-axis of the machine coordinate system forms an angle with the X-axis of the workpiece coordinate system. The Z-axes of both systems are parallel to each other. These angles between the two X-axes are taken into account in the control system of the machine tool, i.e. in the software. This results in the possibility of obtaining surface recesses with both a left-hand orientation and a right-hand orientation, without pivoting the milling spindle 6, solely by interpolation between the axes X', Y', Z' and X, Y, Z of the machine coordinate systems.

Figure 5:
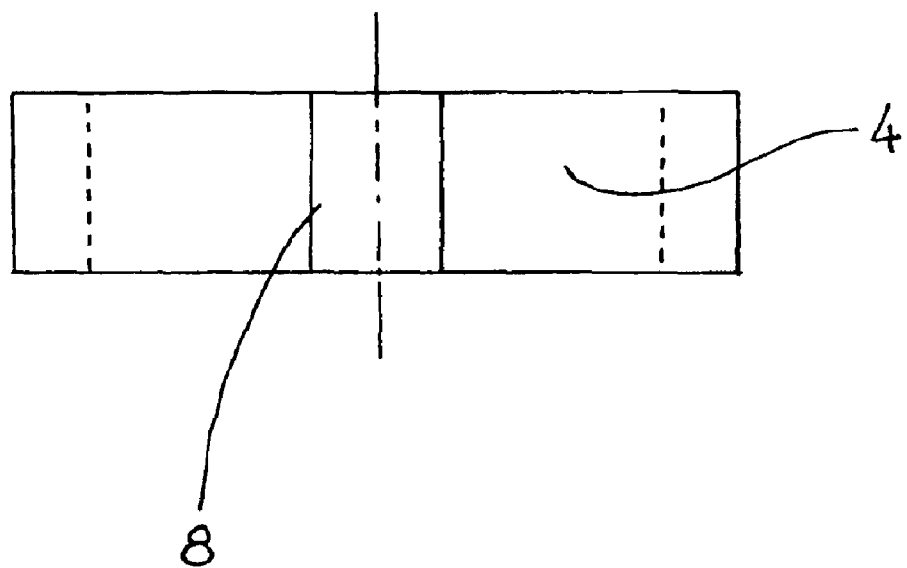
FIG. 5 is a side view of a cam plate according to another embodiment.

FIG. 5 shows the workpiece when the skew angle is set to zero degrees, wherein the recess is machined solely by displacement of the machine tool, i.e. milling tool 5, in the direction of the Z' axis. When the skew is other than zero, the milling tool 5 is displaced along the axis 7 which includes displacement along each of the X', Y', and Z' axis.

In addition, when changing from a left-hand orientation to a right-hand orientation, the side of the tool in contact with workpiece 4 has to be changed. When all workpieces 4 are produced with the same skew angle, an especially simple configuration of the machine tool is obtained, since the position of the milling spindle 6 does not have to be changed.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

The invention is not limited by the embodiments described above which are presented as examples only but can be modified in various ways within the scope of protection defined by the appended patent claims.

What is claimed is:

1. A method of machining surface recesses in a workpiece having a workpiece coordinate system by a machine tool having a machine tool coordinate system, the Z-axes of the workpiece coordinate system and the machine tool coordinate system being parallel, the surface recesses having cross-sections that are non-circular, the method comprising the steps of:

setting the machine tool at a setting angle relative to a Z-axis of the machine tool coordinate system for achieving both the desired non-circular cross-section and a desired skew angle, wherein the skew angle of a surface recess is the angle between a longitudinal axis of the workpiece and a longitudinal axis of the surface recess;

displacing the machine tool relative to the workpiece along the Z-axis of the machine tool coordinate system and as a function of the desired skew angle during operation of the machine tool to form a first surface recess having the desired skew angle;

rotating the workpiece coordinate system relative to the machine tool coordinate system such that the Z-axes remain parallel for aligning the machine tool and the workpiece for machining a second surface recess without resetting the machine tool, wherein the steps of displacing and rotating are performed with a first side of the workpiece facing the machine tool for machining at least one surface recess having a positive skew angle; changing the position of the workpiece so that a second side of the workpiece faces the machine tool, the first side opposing the second side, and performing said steps of displacing and rotating with the second side facing the machine tool for machining at least one surface recess having a negative skew angle without resetting the machine tool, whereby at least one surface recess having a positive skew angle and at least one recess having a negative skew angle are machined without resting the machine tool setting angle.

2. The method of claim 1, wherein the machine tool is settable at a setting angle for effecting a zero-degree skew angle and a setting angle for effecting a non-zero-degree skew angle.

3. The method of claim 1, wherein the skew angle is non-zero and said step of displacing comprises displacing the machine tool relative to the workpiece along all three axes of the workpiece coordinate system.

4. The method of claim 1, wherein said step of rotating further comprises rotating the machine tool until the projection of the machine tool on the X-Y plane of the machine tool coordinate system lies parallel to a main axis of the workpiece coordinate system.

5. The method of claim 1, wherein the workpiece is suspended during the step of displacing so that chips formed during machining fall freely from the workpiece.

6. The method of claim 1, wherein said step of setting comprises setting the machine tool so that an axis of the machine tool deviates from the horizontal and vertical coordinates of the machine tool coordinate system and is skewed relative to a longitudinal axis of the workpiece.

\* \* \* \* \*

UNITED STATES PATENT AND TRADEMARK OFFICE
CERTIFICATE OF CORRECTION

PATENT NO. : 6,908,265 B2  Page 1 of 1
DATED : June 21, 2005
INVENTOR(S) : Jürgen Walz It is certified that error appears in the above-identified patent and that said Letters Patent is hereby corrected as shown below:

<u>Title page,</u>
Item [73], Assignee, insert -- Werkzeugmaschinenfabrik Zerbst GmbH, Zerbst (DE) --.

Signed and Sealed this

Fourteenth Day of March, 2006

JON W. DUDAS
*Director of the United States Patent and Trademark Office*